US012763899B2

(12) United States Patent
Cui et al.

(10) Patent No.: US 12,763,899 B2
(45) Date of Patent: Oct. 13, 2026

(54) REFERENCE POINT SELECTION FOR OTDOA IN A NON-TERRESTRIAL NETWORK

(71) Applicant: Apple Inc., Cupertino, CA (US)

(72) Inventors: Jie Cui, San Jose, CA (US); Chunxuan Ye, San Diego, CA (US); Dawei Zhang, Saratoga, CA (US); Hong He, San Jose, CA (US); Huaning Niu, San Jose, CA (US); Manasa Raghavan, Sunnyvale, CA (US); Qiming Li, Beijing (CN); Sarma V. Vangala, Campbell, CA (US); Yang Tang, San Jose, CA (US); Zhibin Wu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 904 days.

(21) Appl. No.: 17/820,311

(22) Filed: Aug. 17, 2022

(65) Prior Publication Data

US 2023/0061890 A1 Mar. 2, 2023

Related U.S. Application Data

(60) Provisional application No. 63/260,864, filed on Sep. 2, 2021.

(51) Int. Cl.
*H04L 5/00* (2006.01)
*H04B 7/185* (2006.01)
*H04W 24/08* (2009.01)

(52) U.S. Cl.
CPC ....... *H04L 5/0051* (2013.01); *H04B 7/18513* (2013.01); *H04W 24/08* (2013.01)

(58) Field of Classification Search
CPC .............. H04L 5/0051; H04B 7/18513; H04B 7/18563; H04W 24/08; H04W 64/003;
(Continued)

(56) References Cited

U.S. PATENT DOCUMENTS

2017/0150436 A1 5/2017 Modarres Razavi et al.
2018/0035251 A1 2/2018 Bitra
(Continued)

FOREIGN PATENT DOCUMENTS

CN 103517204 1/2014
CN 110383862 10/2019
(Continued)

OTHER PUBLICATIONS

Nokia et al.: "Positioning in NTN", 3GPP TSG RAN WG1 Meeting #98bis, R1-1911223, Oct. 14-20, 2019, 7 sheets.

*Primary Examiner* — Justin T Van Roie
(74) *Attorney, Agent, or Firm* — Fay Kaplun & Marcin, LLP

(57) ABSTRACT

A positioning server is configured to determine a set of anchor points to be used in a positioning method for a user equipment, wherein each of the anchor points is associated with a type of anchor point comprising a terrestrial type or a non-terrestrial type, select a subset of the set of anchor points based on the types of the anchor points, select one anchor point from the subset of anchor points as a reference anchor point based on an expected quality of a positioning reference signal (PRS) transmission received from the anchor point, transmit to the UE a PRS configuration for each of the anchor points and indicating to the UE the reference anchor point and instruct each of the anchor points to transmit respective PRSs in accordance with the PRS configuration.

18 Claims, 8 Drawing Sheets

(58) Field of Classification Search
CPC .... H04W 84/06; G01S 1/0423; G01S 5/0268; G01S 5/10; G01S 5/06; G01S 2205/007
See application file for complete search history.

(56) References Cited

U.S. PATENT DOCUMENTS

| | | | |
|---|---|---|---|
| 2019/0239181 A1 | 8/2019 | Gangakhedkar et al. | |
| 2022/0232465 A1 | 7/2022 | Tsuda | |
| 2023/0049626 A1 * | 2/2023 | Bao ........................ | G01S 5/0284 |

FOREIGN PATENT DOCUMENTS

| | | |
|---|---|---|
| CN | 113273124 | 8/2021 |
| WO | 2020/230511 | 11/2020 |
| WO | 2021/142604 | 7/2021 |

* cited by examiner

REFERENCE POINT SELECTION FOR OTDOA IN A NON-TERRESTRIAL NETWORK

PRIORITY CLAIM/INCORPORATION BY REFERENCE

This application claims priority to U.S. Provisional Application Ser. No. 63/260,864 entitled "Reference Point Selection for OTDOA in a Non-Terrestrial Network," filed on Sep. 2, 2021, the entirety of which is incorporated herein by reference.

BACKGROUND

A user equipment (UE) may establish a connection to at least one of multiple different networks or types of networks, e.g., a public land mobile network (PLMN) operating a 5G New Radio (NR) radio access network (RAN). Observed time distance of arrival (OTDOA) is a multilateration technique where a UE receives a positioning reference signal (PRS) from each of a plurality of anchor points, e.g., network cells. The UE determines precise offsets between the times of arrival (ToAs) of the PRSs to generate a set of reference signal time difference (RSTD) values from which the UE position can be estimated.

In current OTDOA methods, it is assumed that the anchor points are stationary. A non-terrestrial network (NTN) relates to a network utilizing non-terrestrial components, e.g., one or more satellites, to provide UE access to a PLMN. If a non-terrestrial component is selected as an anchor point for an OTDOA position estimation, then the assumption that the anchor points are stationary may no longer be valid, which may cause existing methods for position estimation to be inaccurate.

SUMMARY

Some exemplary embodiments are related to a positioning server configured to perform operations. The operations include determining a set of anchor points to be used in a positioning method for a user equipment, wherein each of the anchor points is associated with a type of anchor point comprising a terrestrial type or a non-terrestrial type, selecting a subset of the set of anchor points based on the types of the anchor points, selecting one anchor point from the subset of anchor points as a reference anchor point based on an expected quality of a positioning reference signal (PRS) transmission received from the anchor point, transmitting to the UE a PRS configuration for each of the anchor points and indicating to the UE the reference anchor point and instructing each of the anchor points to transmit respective PRSs in accordance with the PRS configuration.

Other exemplary embodiments are related to a positioning server configured to perform operations. The operations include determining a set of anchor points to be used in a positioning method for a user equipment, wherein each of the anchor points is associated with a type of anchor point comprising a terrestrial type or a non-terrestrial type, selecting one anchor point from the set of anchor points as a reference anchor point, wherein the reference anchor point is selected as a non-terrestrial anchor point, transmitting to the UE a positioning reference signal (PRS) configuration for each of the anchor points and indicating to the UE the reference anchor point, wherein the indicated reference anchor point is associated with a corresponding time stamp at which the UE is to perform received signal time difference (RSTD) measurements and instructing each of the anchor points to transmit respective PRSs in accordance with the PRS configuration.

DETAILED DESCRIPTION

Figure 1:
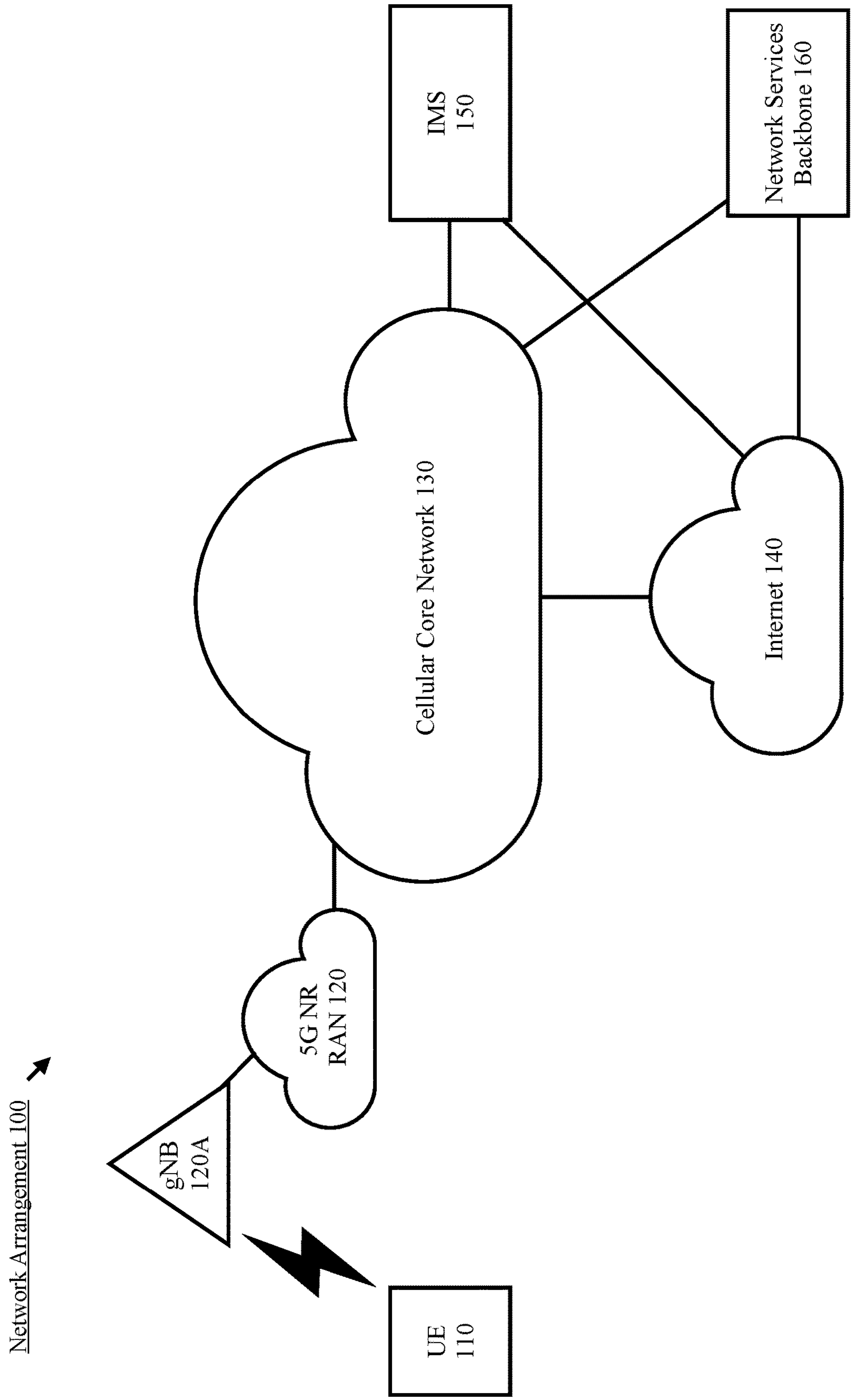
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments describe devices, systems and methods for performing observed time distance of arrival (OTDOA) positioning methods to estimate a position of a user equipment (UE) deployed in a network including non-terrestrial components, e.g., satellites, wherein one or more of the anchor points used in the OTDOA position estimation are non-stationary.

According to some aspects of the present disclosure, criteria are defined for selecting a reference anchor point to be used in the OTDOA positioning estimation when one or more of the anchor points to be used are non-stationary. For example, the reference anchor point may be selected based on the type of anchor point (e.g., terrestrial, non-terrestrial, geostationary, non-geostationary) and/or an expected best quality of signals received from the anchor points. In some embodiments, a positioning server selects the reference anchor point, while in other embodiments, the UE selects the reference anchor point.

In some aspects, a timestamp is used so that the time at which the reference anchor point transmits the PRS measured by the UE is associated with the RSTD measurements generated by the UE. In this way, the positioning server may accurately calculate the location of the UE using the position of the reference anchor point when the PRS was transmitted by the anchor point or received at the UE.

The exemplary embodiments are described with regard to a user equipment (UE). However, reference to a UE is merely provided for illustrative purposes. The exemplary embodiments may be utilized with any electronic component that may establish a connection to a network and is configured with the hardware, software, and/or firmware to exchange information and data with the network. Therefore, the UE as described herein is used to represent any appropriate electronic component. The exemplary embodiments are also described with regard to a 5G New Radio (NR) network. However, reference to a 5G NR network is merely provided for illustrative purposes. The exemplary embodiments may be utilized with any network that may establish a connection to a UE and exchange information and data with the UE. For example, OTDOA positioning methods have been implemented in long term evolution (LTE) networks and have been extended to 5G New Radio (NR) networks.

The exemplary aspects are described with regard to the network being a 5G New Radio (NR) network and a base station being a next generation Node B (gNB). In addition, the exemplary embodiments are described with regard to a next generation node B (gNB) that may be configured with multiple TRPs. A TRP generally refers to a set of components configured to transmit and/or receive a beam, which may be deployed locally at a gNB or may be deployed at various different locations and connected to the gNB via a backhaul connection. Those skilled in the art will understand that TRPs are configured to be adaptable to a wide variety of different conditions and deployment scenarios. The TRPs described herein may represent any type of network component configured to transmit and/or receive a beam, e.g., a beam-formed positioning reference signal (PRS).

OTDOA is a downlink (DL) positioning procedure where a user equipment (UE) receives a positioning reference signal (PRS) from at least three network cells or TRPs and determines a time of arrival (TOA) for each of the PRSs. A first cell is selected as a reference cell (reference anchor point) and a time difference between the ToA of the PRS from the first cell and each of the TOAs of the PRS from the remaining cells (neighbor anchor points) is calculated. The relative time difference between the PRS from the reference cell and from one of the neighbor cells is the reference signal time difference (RSTD) measurement for that cell. OTDOA requires strict time-synchronization for the transmission of the PRSs from the respective anchor points.

Throughout this description, a gNB may be referred to as a "serving cell." A gNB that is acting as a serving cell is the cell to which a UE is currently connected, e.g., the UE may be in a Radio Resource Control (RRC) Connected state with the gNB and may be actively exchanging data and/or control information with the cell. A gNB may also be referred to as a "positioning gNB," a "positioning node," a "positioning cell," or an "anchor point." A gNB or a TRP acting as a positioning node or anchor point is a cell that is assisting in locating the UE, e.g., transmitting positioning reference signals (PRSs) to the UE to assist in locating the UE. A gNB may simultaneously act as a serving cell and an anchor point with respect to a UE or may act only as an anchor point for a UE.

In some scenarios, a gNB may include one or more TRPs located on a non-terrestrial component. In other scenarios, a gNB may be located on a non-terrestrial component and comprise TRPs located on terrestrial components. The exemplary embodiments are described with regard to a 5G NR network integrated with a non-terrestrial-network (NTN) utilizing one or more satellites to provide UE access to the 5G NR radio access network (RAN). Throughout this description, the non-terrestrial component is generally described as a satellite. However, it should be understood that any reference to a satellite is only exemplary and the exemplary embodiments may apply to other types of non-terrestrial components, e.g., airplanes, unmanned aerial vehicles (UAVs), etc.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the network with which the UE 110 may wirelessly communicate is a 5G NR radio access network (RAN) 120. However, the UE 110 may also communicate with other types of networks (e.g., 5G cloud RAN, a next generation RAN (NG-RAN), a long term evolution RAN, a legacy cellular network, a WLAN, etc.) and the UE 110 may also communicate with networks over a wired connection. With regard to the exemplary embodiments, the UE 110 may establish a connection with the 5G NR RAN 120. Therefore, the UE 110 may have a 5G NR chipset to communicate with the NR RAN 120.

The 5G NR RAN 120 may be a portion of a cellular network that may be deployed by a network carrier (e.g., Verizon, AT&T, T-Mobile, etc.). The 5G NR RAN 120 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set.

In network arrangement 100, the 5G NR RAN 120 includes a base station (e.g., gNB 120A) that represents a gNB that may be in a non-terrestrial network (NTN) deployment. For example, a satellite-based system may be integrated with the 5G NR RAN 120 to provide network access to the UE 110.

Figure 2:
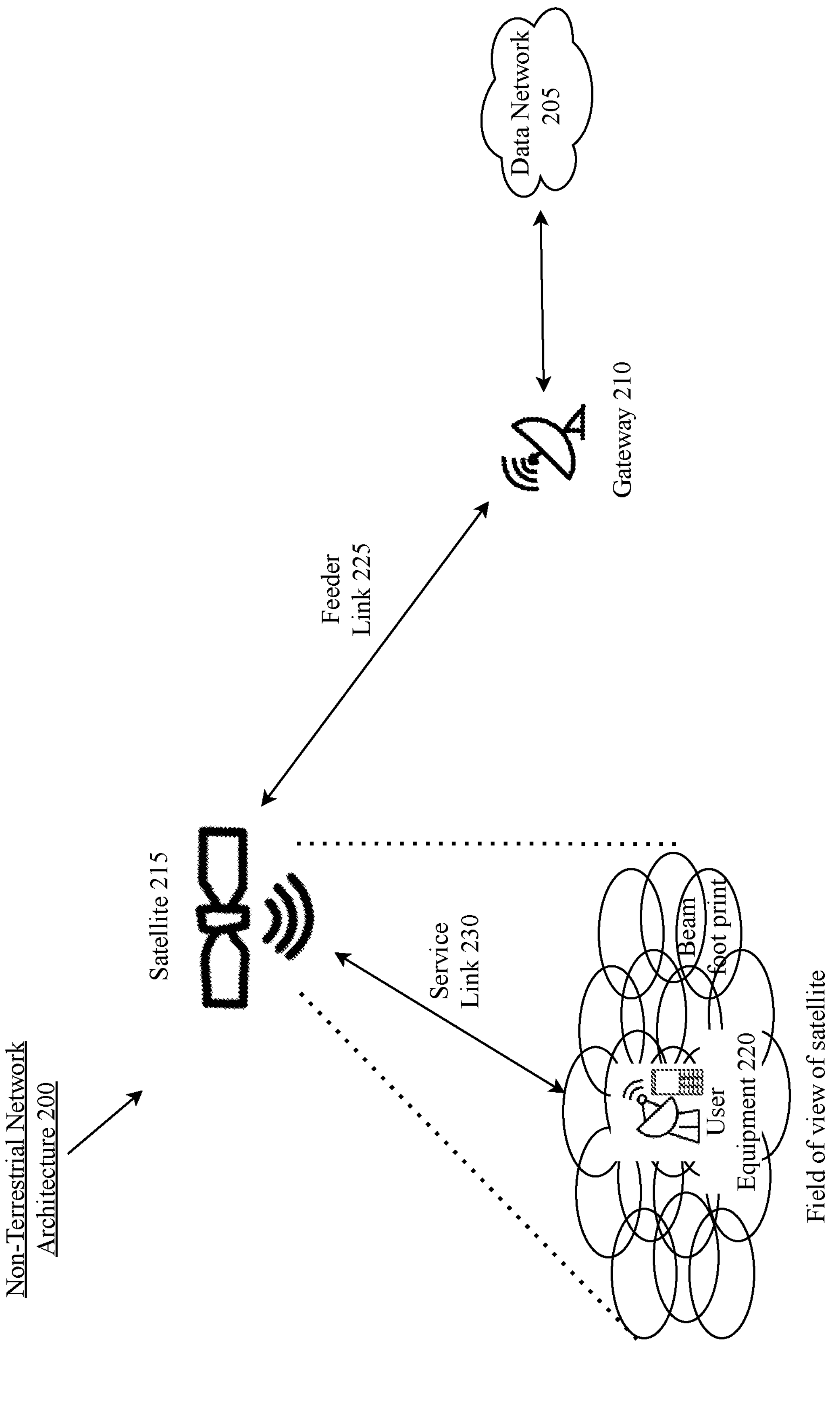
FIG. 2 shows an exemplary non-terrestrial network (NTN) architecture according to various exemplary embodiments.

FIG. 2 shows an exemplary non-terrestrial network (NTN) architecture 200 according to various exemplary embodiments. An NTN may relate to any network using non-terrestrial components, such as satellites, airplanes, unmanned aerial vehicles (UAVs), etc., to provide network services to a user terminal.

The NTN architecture 200 represents a network arrangement including one or more satellites 215 integrated with a data network 205. The data network 205 may be, for example, the 5G NR RAN 120 described above with respect to FIG. 1. The NTN architecture 200 includes a gateway 210 connecting the terrestrial data network 205 with the NTN components. In the NTN architecture 200 of FIG. 2, the gateway 210 and the satellite 215 communicate via a feeder link 225. However, any number of satellites 215 may communicate with any number of gateways 210 via any number of respective feeder links 225. For example, in some NTN deployments, some satellites may be served by several gateways simultaneously.

The satellite 215 provides network services to a UE 220 via a service link 230. The satellite 215 may implement either a transparent payload or a regenerative payload. A transparent payload refers to an arrangement where the satellite 215 receives signals and transmits an amplified version of the signal, with a frequency conversion. For example, the satellite 215 may receive uplink communications from the UE on service link 230 frequencies and transmit an amplified version of the signal to the network 205 on feeder link 225 frequencies or may receive downlink communications from the network 205 on the feeder link 235 frequencies and transmit an amplified version of the signal to the UE 210 on the service link 230 frequencies. A regenerative payload refers to an arrangement where the satellite 215 acts as a distributed unit (DU) or a base station (e.g., a gNB), wherein received signals are regenerated with signal-processing techniques (e.g., demodulation, decoding, switching, encoding, modulation, etc.) before being retransmitted. The satellite 215 generates one or more beams over a service area bounded by its field of view, which is dependent on the antenna diagram and minimum elevation angle of the satellite 215. The footprint 235 of the beams are typically elliptically shaped.

With reference to FIG. 1, in a regenerative payload arrangement, the gNB 120A may be located on an aerial component, e.g., the satellite 215 of FIG. 2. In a transparent payload arrangement, the gNB 120A may be located on the ground and the satellite 215 is used to mirror the signals between the gNB 120 and the UE 110, as described above.

The example shown in FIG. 2 is not intended to limit the exemplary embodiments in any way. Those skilled in the art will understand that NTNs may be integrated with the 5G NR RAN and/or other networks in any of a variety of manners. For example, a typical satellite-based NTN may comprise a low earth orbit (LEO) constellation including an array of satellites and gateways with broad interconnectivity via ground-to-ground station (G2G) links, satellite-to-satellite (S2S) links, ground-to-satellite (G2S) links, and satellite-to-ground (S2G) links. Other types of satellite-based NTNs include geostationary-orbiting (GEO) satellites or medium-earth-orbiting (MEO) satellites.

A geostationary (GEO) satellite is an earth-orbiting satellite placed at a specific altitude directly over the equator of the earth. A GEO satellite revolves in the same direction as the rotation of the earth, i.e., west to east, and, at this altitude, orbits the earth once very 24 hours, i.e., the same length of time as the earth requires to rotate once on its axis. Thus, the geostationary satellite appears stationary (or nearly stationary) in the sky relative to a ground-based observer.

The different types of NTNs each have respective strengths and weaknesses and may be deployed in a variety of scenarios, depending on the goal to be achieved, e.g., broad coverage across a large region, concentrated coverage in an urban environment or along a highly trafficked route, etc. Thus, the NTN architecture 200 described in FIG. 2 is merely provided for illustrative purposes.

Returning to the network arrangement 100 of FIG. 1, the gNB 120A may include one or more communication interfaces to exchange data and/or information with the UE 110, the corresponding 5G NR RAN 120, the cellular core network 130, the internet 140, etc.

The UE 110 may connect to the 5G NR-RAN 120 via the gNB 120A. Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific cell (e.g., the gNB 120A). However, as mentioned above, reference to the 5G NR-RAN 120 is merely for illustrative purposes and any appropriate type of RAN may be used.

In addition to the 5G NR RAN 120, the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140.

The core network 130 may include a location management function (LMF) to support location determinations for a UE, which may also be referred to as a positioning server. As will be described further below, in the exemplary aspects described herein, the LMF may instruct a serving cell to configure a target UE for PRS reception, provide information to a plurality of positioning gNBs to transmit the PRS sets, receive the RSTD measurements from the UE via the serving cell and determine a position of the target UE from the RSTD measurements.

The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 3:
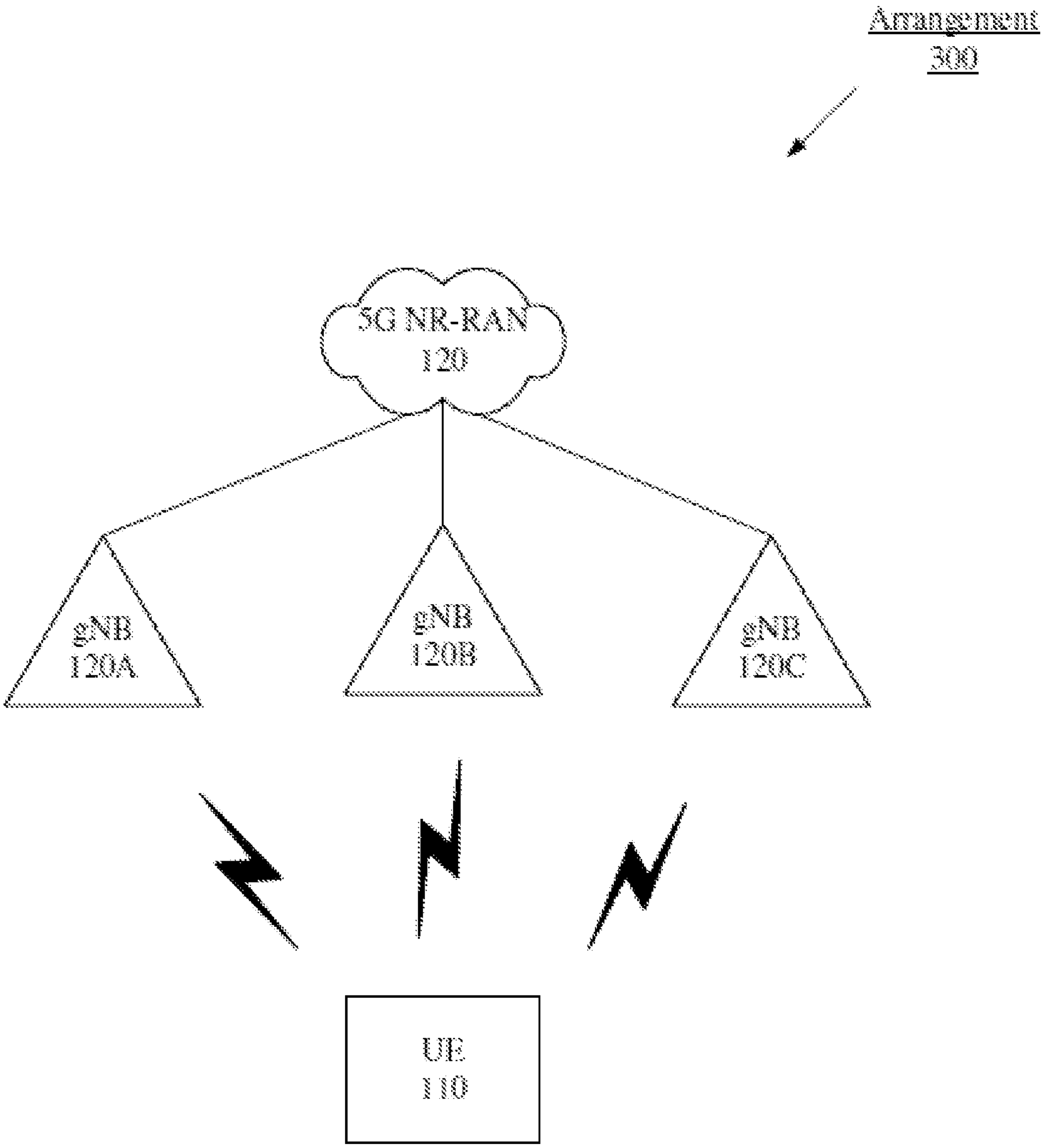
FIG. 3 shows an exemplary system arrangement that includes the UE of FIG. 1 configured for OTDOA functionality having a network connection to a network cell and being capable of receiving positioning signals from a plurality of further network cells according to various exemplary embodiments.

FIG. 3 shows an exemplary system arrangement 300 that includes the UE 110 configured for OTDOA functionality having a network connection to a network cell and being capable of receiving positioning reference signals (PRSs) from a plurality of further network cells according to various exemplary embodiments. FIG. 3 will be described relative to the network arrangement 100 of FIG. 1 and the non-terrestrial network (NTN) architecture 200 of FIG. 2. In some embodiments, the network cells may correspond to one or more TRPs of a gNB and/or to a satellite-based gNB/TRP serving as an anchor point for OTDOA calculations.

The exemplary system arrangement 300 illustrates the UE 110 configured with a network connection to the 5G NR radio access network (RAN) 120, i.e., a network connection via gNB 120A. The UE 110 may further be operable to receive signals from a gNB 120B and a gNB 120C without establishing a dedicated connection with these cells. However, the UE 110 may establish further network connections with further network cells and/or receive signals therefrom. An OTDOA measurement uses signaling from at least three cells, but, because each individual measurement has a level of uncertainty associated therewith, more cells may be used to increase the accuracy of the measurement.

OTDOA is a downlink (DL) positioning procedure where a user equipment (UE) receives a positioning reference signal (PRS) from at least three network cells/TRPs and determines a time of arrival (TOA) for each of the PRSs. A first cell is selected as a reference cell (reference anchor point) and a time difference between the TOA of the first cell and each of the TOAs of the remaining cells is calculated. The relative time difference between two of the cells is the reference signal time difference (RSTD) measurement. In the arrangement of FIG. 3 comprising gNBs 120A, 120B and 120C, the gNB 120A may be selected as the reference cell and the relative time difference between the TOAs of gNB 120A and 120B and the relative time difference between the TOAs of gNB 120A and gNB 120C may be the RSTD measurements for the OTDOA procedure.

In UE-assisted OTDOA, the UE performs RSTD measurements and reports the measurements to the positioning server, which then calculates the location estimate for the UE. In UE-based OTDOA, the UE performs the RSTD measurements and calculates a location estimate for itself, which is then reported and verified by the network. The exemplary embodiments may be applied to either type of OTDOA.

Figure 4:
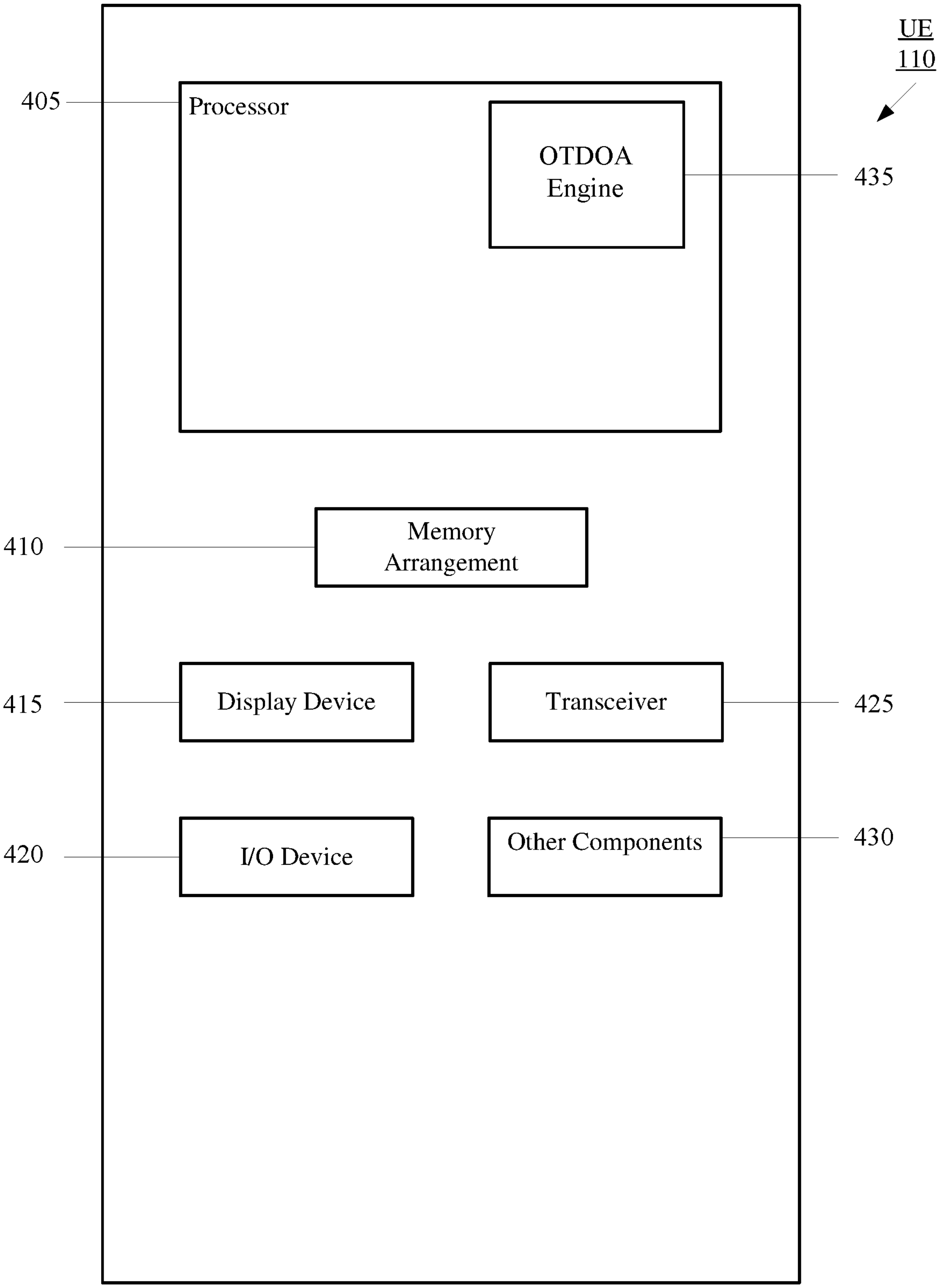
FIG. 4 shows an exemplary user equipment (UE) according to various exemplary embodiments.

FIG. 4 shows an exemplary UE 110 according to various exemplary embodiments. The UE 110 will be described with regard to the network arrangement 100 of FIG. 1. The UE 110 may include a processor 405, a memory arrangement 410, a display device 415, an input/output (I/O) device 420, a transceiver 425 and other components 430. The other components 430 may include, for example, an audio input device, an audio output device, a power supply, a data acquisition device, ports to electrically connect the UE 110 to other electronic devices, etc.

The processor 405 may be configured to execute a plurality of engines of the UE 110. For example, the engines may include an OTDOA engine 435 configured for performing aspects of an OTDOA positioning method. For example, the UE 110 may receive an OTDOA configuration from the network and a request to provide RSTD measurements for the network to use to estimate the location of the UE 110. The UE 110 may perform the RSTD measurements and report the same to the network. In some embodiments, to be described in further detail below, the UE 110 selects a reference anchor point to use in the OTDOA method, regardless of a reference anchor point indicated by the network. In other embodiments, the UE 110 includes a time stamp in the report indicating the time at which the measurements were generated, to be described in greater detail below.

The above referenced engine being an application (e.g., a program) executed by the processor 405 is only exemplary. The functionality associated with the engine 435 may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 405 is split among two or more processors such as a baseband processor and an applications processor. The exemplary embodiments may be implemented in any of these or other configurations of a UE.

The memory arrangement 410 may be a hardware component configured to store data related to operations performed by the UE 110. The display device 415 may be a hardware component configured to show data to a user while the I/O device 420 may be a hardware component that enables the user to enter inputs. The display device 415 and the I/O device 420 may be separate components or integrated together such as a touchscreen. The transceiver 425 may be a hardware component configured to establish a connection with the 5G NR-RAN 120, an LTE-RAN (not pictured), a legacy RAN (not pictured), a WLAN (not pictured), etc. Accordingly, the transceiver 425 may operate on a variety of different frequencies or channels (e.g., set of consecutive frequencies).

Figure 5:
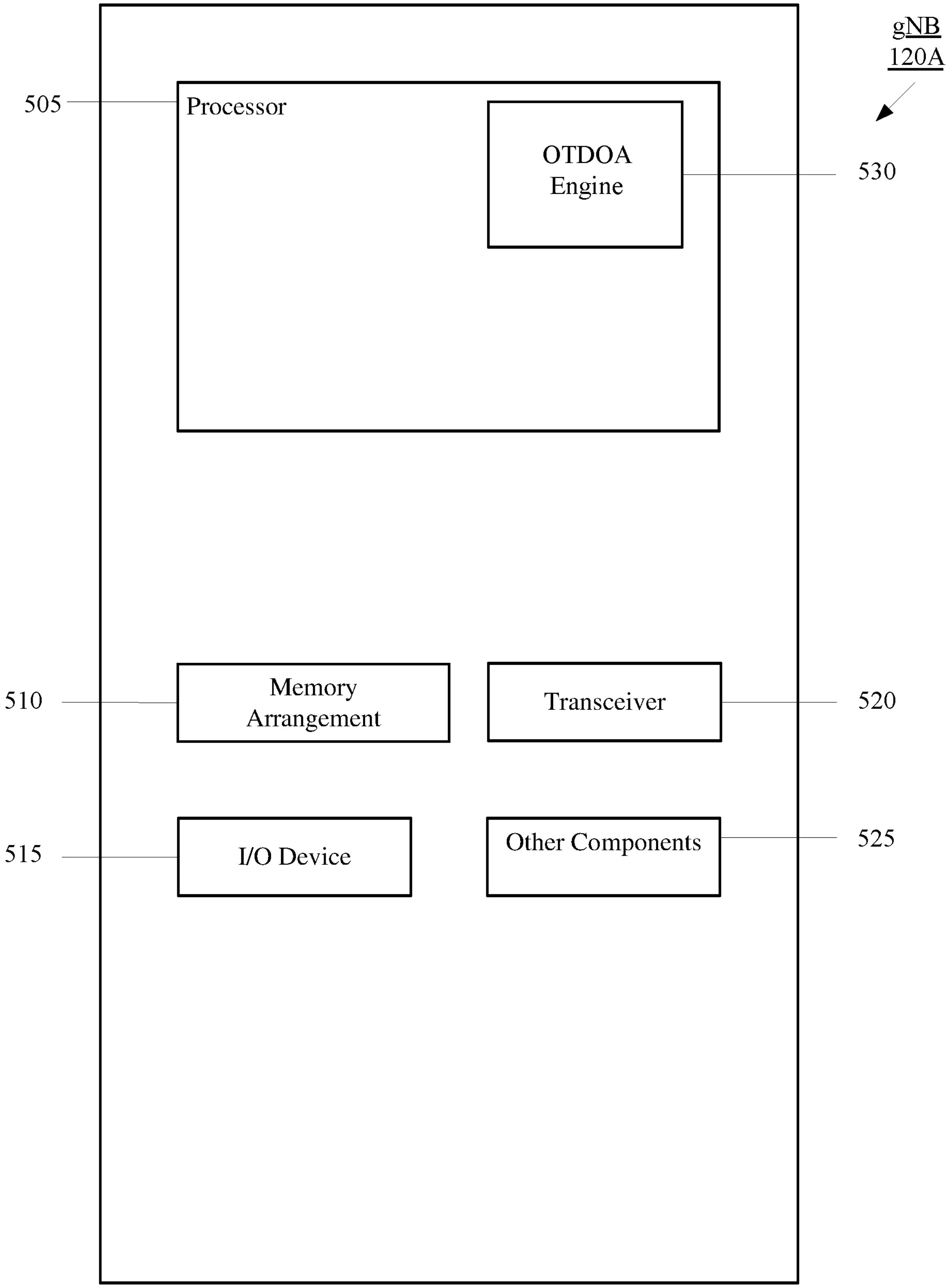
FIG. 5 shows an exemplary base station according to various exemplary embodiments.

FIG. 5 shows an exemplary base station, e.g., gNB 120A, according to various exemplary embodiments. The gNB 120A may represent any access node through which the UE 110 may establish a connection and manage network operations.

The gNB 120A may include a processor 505, a memory arrangement 510, an input/output (I/O) device 515, a transceiver 520, and other components 525. The other components 525 may include, for example, a battery, a data acquisition device, ports to electrically connect the base station to other electronic devices, etc.

The processor 505 may be configured to execute a plurality of engines of the gNB 120A. For example, the processor 505 of the gNB 120A may execute an OTDOA engine 530 for performing aspects of an OTDOA positioning method. For example, the gNB 120A may configure the UE 110 with an OTDOA configuration and request the UE 110 to provide RSTD measurements for the network to use to estimate the location of the UE 110. In some embodiments, to be described in further detail below, the gNB 120A selects a reference anchor point for the UE 110 to use in the OTDOA method. In other embodiments, the gNB 120A includes a time stamp in the OTDOA configuration indicating the time at which the measurements are to be generated by the UE 110, to be described in greater detail below.

However, reference to a processor 505 is only exemplary. The functionality associated with the engine 530 may also be represented as a separate incorporated component of the gNB 120A or may be a modular component coupled to the gNB 120A, e.g., an integrated circuit with or without firmware. For example, the integrated circuit may include input circuitry to receive signals and processing circuitry to process the signals and other information. In addition, in some base stations, the functionality described for the processor 505 is split among a plurality of processors (e.g., a baseband processor, an applications processor, etc.). The exemplary embodiments may be implemented in any of these or other configurations of a base station.

The memory 510 may be a hardware component configured to store data related to operations performed by the gNB 120A. The I/O device 515 may be a hardware component or ports that enable a user to interact with the gNB 120A. The transceiver 520 may be a hardware component configured to exchange data with the UE 110 and any other UE in the system 100. The transceiver 520 may operate on a variety of different frequencies or channels (e.g., set of consecutive frequencies). Therefore, the transceiver 520 may include one or more components (e.g., radios) to enable the data exchange with the various networks and UEs.

In OTDOA positioning, a positioning UE estimates the ToAs of PRSs from multiple anchor points and then derives the RSTD between each anchor point and the reference anchor point. In the RSTD calculation, one of the anchor points is the reference anchor point, and RSTD is calculated as $ToA_{positioning\ cells}-ToA_{reference}$, wherein $ToA_{reference}$ is the ToA of the reference anchor point and $ToA_{positioning\ cells}$ is the ToA of the anchor points other than the reference anchor point.

To perform the RSTD measurements, the positioning server (e.g., the LMF), via e.g., the serving gNB, may provide the UE with assistance information including a PRS configuration for each of the anchor points. The assistance information may designate a reference cell and associated information for the PRS configuration. For example, the reference cell may be indicated by a physical cell ID or TRP index, and PRS parameters including PRS resources or resource sets, an antenna port configuration, etc. may be provided to the UE.

The positioning server may then send a request for location information to the UE, the request including parameters such as a maximum response time, e.g., an RSTD measurement period. In some exemplary embodiments, the RSTD measurement period may have a duration anywhere between 1 second and over two minutes. However, the exemplary embodiments are not limited to any particular duration. With legacy OTDOA, in the RSTD measurement period, the time when the UE performs the reference point ToA estimation may be based on UE implementation. The UE performs the measurements using the provided assistance data and then reports the RSTD back to the positioning server together with the positioning reference anchor point index (e.g., cell ID or TRP index). With this information, the positioning server may estimate the current UE location.

In existing OTDOA positioning, it is assumed that the anchor points (e.g., gNBs or positioning sites in legacy systems) are stationary, including the reference anchor point. However, this assumption may be invalid in a Non-Terrestrial Network (NTN) scenario, where a non-terrestrial component (e.g., a satellite, aerial drone, etc.) may be in constant motion. If the reference anchor point location has changed during the RSTD measurement period, it would cause problems for the positioning calculation. The positioning server may not be aware of when the UE performed the ToA measurement of the reference anchor point.

Figure 6A:
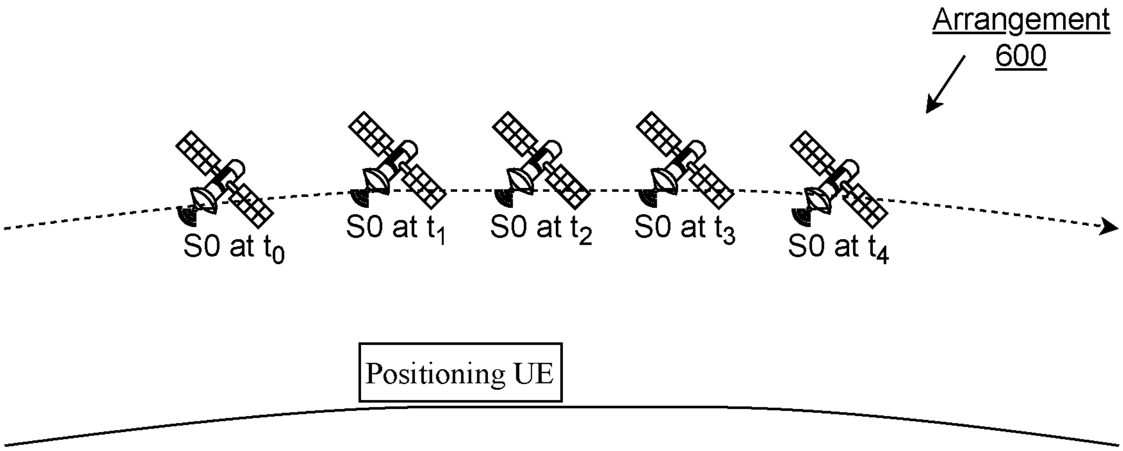
FIG. 6*a* shows an exemplary arrangement including a satellite configured as an anchor point for an OTDOA positioning method for a UE according to various exemplary embodiments.

FIG. 6*a* shows an exemplary arrangement 600 including a satellite configured as an anchor point for an OTDOA positioning method for a UE. As shown, the position of the satellite S0 relative to the positioning UE changes based on time. If the satellite S0 moves relative to the UE, then the assumption that the anchor point is stationary is invalid, which may cause problems when the position of the UE is calculated.

According to various exemplary embodiments described herein, the following scenarios are considered for NTN OTDOA positioning. In a first scenario, the OTDOA positioning anchor points include both terrestrial gNBs/TRPs and non-terrestrial gNBs/TRPs. In a second scenario, the OTDOA positioning anchor points include only non-terrestrial gNBs, the non-terrestrial gNBs including both geostationary satellites and non-geostationary satellites (or other types of NTN gNBs/TRPs). In a third scenario, the OTDOA positioning anchor points include only non-geostationary satellites.

According to a first exemplary embodiment, the first scenario discussed above is considered, wherein the positioning anchor points used for an OTDOA positioning method for a UE include mixed terrestrial and non-terrestrial gNBs/TRPs. For the first scenario, the following options may be used for selecting a reference anchor point.

In a first option, from the positioning server side, the positioning server always chooses a terrestrial gNB/TRP for the UE as the positioning reference cell (reference anchor point) for OTDOA. If the reference anchor point is stationary, then the accuracy of the position estimation may be improved relative to a non-stationary reference anchor point.

Within the subset of terrestrial gNBs/TRPs, the positioning server may choose the best quality terrestrial cell as the positioning reference cell for OTDOA for UE. The best quality cell may correspond to the cell with the highest expected signal quality. For example, the best quality cell may be determined to be the serving cell of the UE. In another example, the best quality cell may be determined to be the closest anchor point to the target UE. The positioning server may determine which cell is the closest based on UE-measured reference signal received power (RSRP) values reported by the serving cell of the UE to the positioning server, or by the UE itself. Alternatively, the positioning server may determine which cell is the closest based on a GIS (geographic information system) database.

In a second option, from the UE implementation side, the UE always chooses a terrestrial gNB/TRP as the positioning reference cell (reference anchor point) for OTDOA, regardless of the positioning reference cell configured by the positioning server. Within the subset of terrestrial gNBs/TRPs, the UE may choose the best quality terrestrial cell as the positioning reference cell to use for OTDOA. Similar to the first option above, the best quality cell may correspond to the cell with the highest expected signal quality. For example, the best quality cell may be determined to be the serving cell of the UE. In another example, the best quality cell may be determined to be the closest anchor point to the target UE. The UE may determine which cell is the closest based on UE-measured RSRP.

The UE may know the cell type of the various anchor points based on OTDOA assistance information provided by the network, the OTDOA assistance information including parameters such as the PRS configuration. The type of the cell (e.g., terrestrial, non-terrestrial, geostationary, non-geostationary) may be associated with the cell-ID for the cell.

In a third option, from the positioning server side, the positioning server may choose a non-terrestrial gNB/TRP as the positioning reference cell. However, in addition to selecting the cell itself, the positioning server may additionally select a specific time at which the UE is to perform the PRS measurements. This time may be indicated to the UE with a time stamp. The time stamp may be indicated relative to the corresponding PRS timing information, e.g., as a PRS measurement occasion, or may be indicated as an absolute time or a slot/symbol index.

Figure 6B:
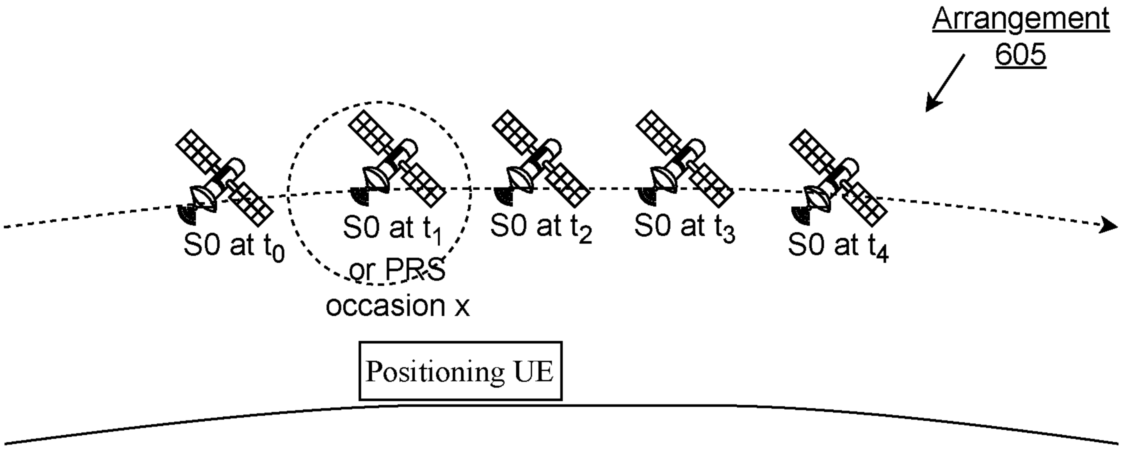
FIG. 6*b* shows an exemplary arrangement including a satellite configured as a reference anchor point for an OTDOA positioning method for a UE according to various exemplary embodiments.

FIG. 6*b* shows an exemplary arrangement 605 including a satellite configured as a reference anchor point for an OTDOA positioning method for a UE. As shown, the position of the satellite S0 relative to the positioning UE changes based on time. Thus, the configuration of the reference anchor point additionally includes a time stamp. In this example the time stamp corresponds to time t1. With the correlated time stamp, the position of the satellite may be determined at the time the PRS was transmitted, and the location of the UE at or around this time can be determined.

Similar to above, the positioning server may choose the best quality NTN satellite as the positioning reference cell for OTDOA, wherein the best quality cell might be a serving satellite of the UE or the satellite closest to the target UE, wherein the determination of the closest satellite may be based on UE-measured RSRP.

In a fourth option, from the UE implementation side, the UE may choose a satellite as the positioning reference cell (reference anchor point) for OTDOA, regardless of the positioning reference cell configured by the positioning server. However, when the UE reports the RSTD values to the network, the UE may additionally indicate the positioning reference cell together with a specific time at which the UE performed the PRS measurements. This time may be indicated in the report as a time stamp. The time stamp may be indicated relative to the corresponding PRS timing information, e.g., as a PRS measurement occasion, or may be indicated as an absolute time or a slot/symbol index.

Similar to above, the UE may choose the best quality satellite as the positioning reference cell to use for OTDOA. The best quality satellite may correspond to a serving satellite of the UE or the closest satellite to the UE, wherein the UE determines which satellite is the closest based on UE-measured RSRP.

According to a second exemplary embodiment, the second scenario discussed above is considered, wherein the positioning anchor points used for OTDOA include mixed geostationary satellites and non-geostationary satellites. For the second scenario, the following options may be used for selecting a reference anchor point.

In a first option, from the positioning server side, the positioning server may always choose the geostationary NTN satellites as the positioning reference cell for OTDOA for UE. The positioning server would provide the NTN satellite type to UE. Similar to above, the positioning server chooses the best quality geostationary NTN satellites as the positioning reference cell for OTDOA for UE. For example, the best quality geostationary NTN satellites might be the serving satellite of the UE. In another example, the best quality geostationary NTN satellites might be the closest one to the target UE. The positioning server may determine the closest geostationary NTN satellite based on UE-measured RSRP.

Figure 6C:
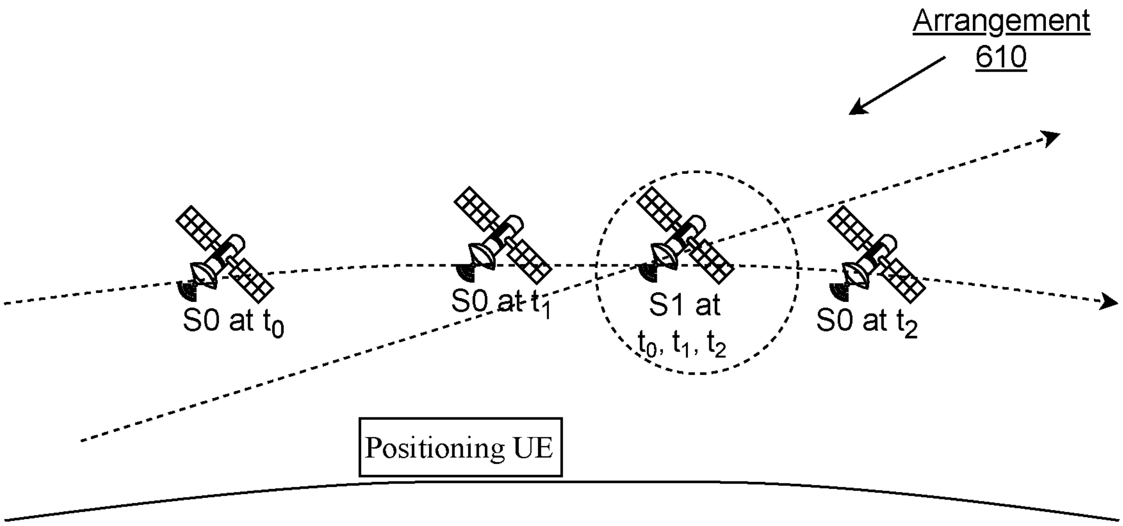
FIG. 6*c* shows an exemplary arrangement including a geostationary satellite configured as a reference anchor point for an OTDOA positioning method for a UE according to various exemplary embodiments.

FIG. 6*c* shows an exemplary arrangement 610 including a geostationary satellite configured as a reference anchor point for an OTDOA positioning method for a UE. As shown, the position of the non-geostationary satellite S0 relative to the positioning UE changes based on time, while the position of the geostationary satellite S1 relative to the positioning UE does not change based on time. Thus, when the geostationary satellite S1 is configured as the reference anchor point, an additional time stamp is not necessary.

In a second option, from the UE implementation side, the UE may always choose the geostationary NTN satellite as the positioning reference cell for OTDOA, regardless of the positioning reference cell configured by the positioning server. The positioning server provides the NTN satellite types to the UE, and the UE may choose the best quality geostationary NTN satellites as the positioning reference cell for OTDOA. For example, the best quality geostationary NTN satellites may be the serving satellite of the UE. In another example, the best quality geostationary NTN satellites may be the closest one to the target UE. The UE may determine the closest geostationary NTN satellites based on measured RSRP.

According to other options, similar to the third and fourth options discussed above with respect to the first exemplary embodiment, the positioning server may configure a non-geostationary satellite and the UE may choose a non-geostationary satellite, so long as the time stamp discussed above is included in the configuration or reported by the UE along with the positioning reference gNB/cell/TRP/satellite ID.

According to a third exemplary embodiment, the third scenario discussed above is considered, wherein the positioning anchor points used for OTDOA include only non-geostationary satellites. For the third scenario, the third and fourth options for the first exemplary embodiment may be used for selecting a reference anchor point. That is, from the positioning server side, a non-geostationary satellite may be configured as the reference anchor point with an associated time stamp. From the UE implementation side, a non-geostationary satellite may be selected as the reference anchor point and the RSTD values reported with an associated time stamp.

Figure 6D:
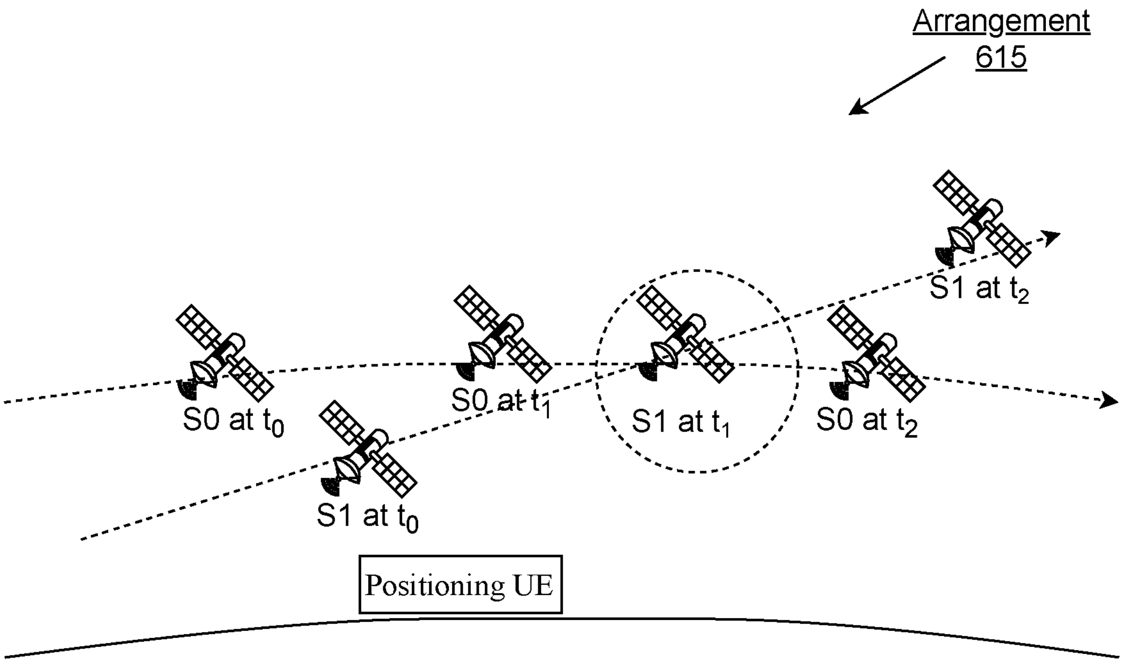
FIG. 6*d* shows an exemplary arrangement including a non-geostationary satellite configured as a reference anchor point for an OTDOA positioning method for a UE according to various exemplary embodiments.

FIG. 6*d* shows an exemplary arrangement 615 including a non-geostationary satellite configured as a reference anchor point for an OTDOA positioning method for a UE. As shown, the position of the non-geostationary satellites S0 and S1 relative to the positioning UE changes based on time. Thus, when the non-geostationary satellite S1 is configured as the reference anchor point, an additional time stamp is necessary.

Figure 7:
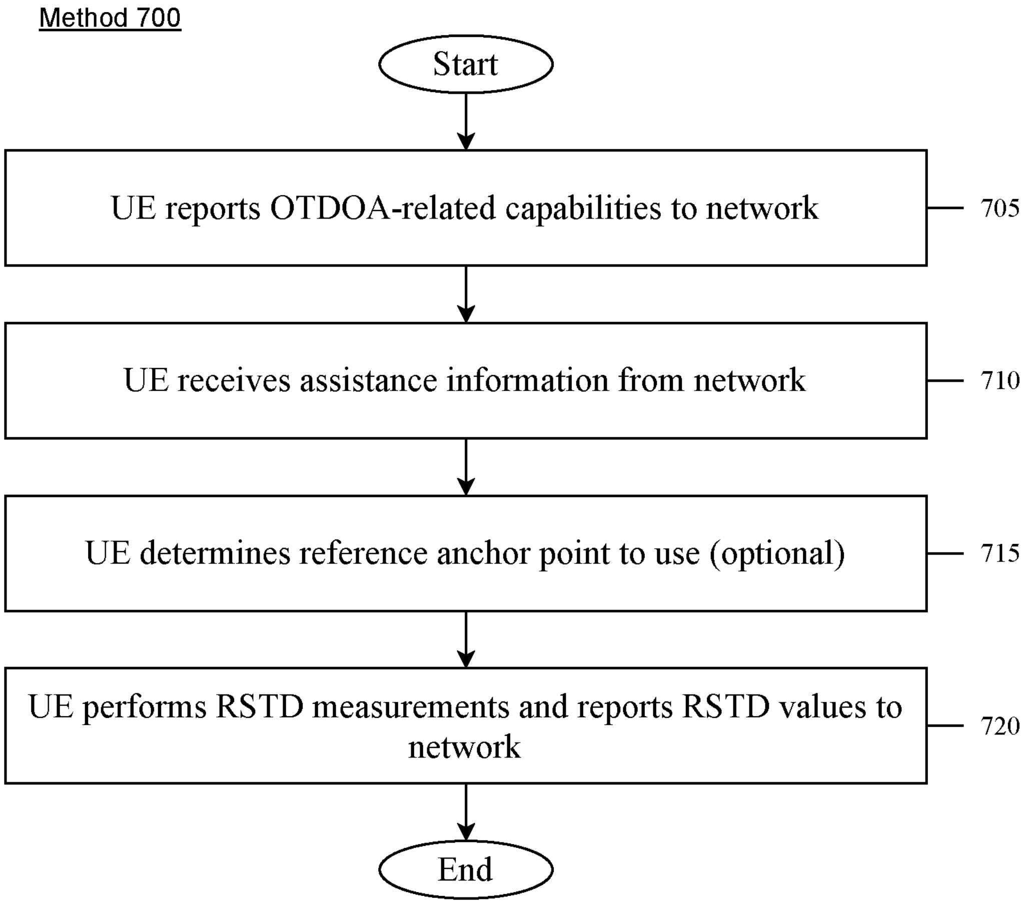
FIG. 7 shows a method for performing OTDOA positioning methods using one or more non-terrestrial anchor points according to various exemplary embodiments described herein.

FIG. 7 shows a method 700 for performing OTDOA positioning methods using one or more non-terrestrial anchor points according to various exemplary embodiments described herein.

In 705, the UE reports its OTDOA-related capabilities to the network, e.g., via a serving gNB. In 710, the UE receives assistance information from the positioning server of the network including PRS configurations for the anchor points to measure. Included in the PRS configuration may be a designation of a reference cell to use. In some embodiments, the reference cell may have a "type" associated therewith, e.g., terrestrial, non-terrestrial, geostationary, non-geostationary, etc.

The reference cell may be selected by the positioning server based on criteria including the type of anchor point. For example, in a scenario where PRS are configured for cells/TRPs including a mix of terrestrial cells and non-terrestrial cells, only the terrestrial cells may be considered as potential reference points. In another scenario where PRS are configured for cells including a mix of geostationary non-terrestrial cells and non-geostationary non-terrestrial cells, only the geostationary cells may be considered as potential reference points.

Within the subset of anchor points selected based on the type criterion, a specific anchor point may be selected as the reference anchor point based on a determination of an expected best quality signal to be received from the anchor point.

In some embodiments, in the assistance information, the reference cell has a timestamp associated therewith. Particularly when the reference cell is a non-geostationary satellite, the positioning server configures the reference cell with the time stamp so that the time of the RSTD measurements can be known.

In optional 715, the UE determines a reference anchor point to use for the OTDOA method regardless of any reference anchor point indicated by the network. The criteria for selecting the reference anchor point may be similar to those described above for the positioning server, e.g., based on type and/or expected best quality of the signal.

In 720, the UE performs the RSTD measurements and reports the RSTD values to the network. In some embodiments, the RSTD values are reported in combination with an indication of the reference anchor point used for the measurements and the time stamp for the reference anchor point. This information allows the positioning server to estimate the location of the UE.

EXAMPLES

In a first example, a positioning server is configured to perform operations comprising determining a set of anchor points to be used in a positioning method for a user equipment, wherein each of the anchor points is associated with a type of anchor point comprising a terrestrial type or a non-terrestrial type, selecting one anchor point from the set of anchor points as a reference anchor point, wherein the reference anchor point is selected as a non-terrestrial anchor point, transmitting to the UE a positioning reference signal (PRS) configuration for each of the anchor points and indicating to the UE the reference anchor point, wherein the indicated reference anchor point is associated with a corresponding time stamp at which the UE is to perform received signal time difference (RSTD) measurements and instructing each of the anchor points to transmit respective PRSs in accordance with the PRS configuration.

In a second example, the positioning server of the first example, wherein the reference anchor point is selected as a closest anchor point to the UE.

In a third example, the positioning server of the second example, wherein the closest anchor point to the UE is determined based on reference signal received power (RSRP) measurements reported by the UE or a serving cell of the UE.

In a fourth example, the positioning server of the first example, wherein the time stamp comprises an absolute time, a slot index or a symbol index.

In a fifth example, the positioning server of the first example, wherein the time stamp comprises a PRS occasion.

In a sixth example, the positioning server of the first example, wherein the operations further comprise receiving, in a report, RSTD values determined by the UE, wherein the report further comprises an indication of the reference anchor point used in the RSTD value determinations.

In a seventh example, the positioning server of the sixth example, wherein the operations further comprise determining a location for the UE based on the reported RSTD values, the indication of the reference anchor point and the time stamp.

In an eighth example, the positioning server of the first example, wherein the associated type of anchor point is provided to the UE for the reference anchor point.

In a ninth example, a base station comprising a transceiver configured to communicate with a user equipment (UE) and a processor communicatively coupled with the transceiver and configured to perform operations comprising transmitting, to the UE, a positioning reference signal (PRS) configuration for each of a set of anchor points to be used in a positioning method for a user equipment and indicating to the UE a reference anchor point associated with a corresponding time stamp at which the UE is to perform received signal time difference (RSTD) measurements, wherein the reference anchor point is selected as a non-terrestrial anchor point.

In a tenth example, the base station of the ninth example, wherein the time stamp comprises an absolute time, a slot index or a symbol index.

In an eleventh example, the base station of the ninth example, wherein the time stamp comprises a PRS occasion.

In a twelfth example, the base station of the ninth example, wherein the operations further comprise receiving, in a report, RSTD values determined by the UE, wherein the report further comprises an indication of the reference anchor point used in the RSTD value determinations.

In a thirteenth example, the base station of the twelfth example, wherein the operations further comprise determining a location for the UE based on the reported RSTD values, the indication of the reference anchor point and the time stamp.

In a fourteenth example, a processor of a user equipment (UE) is configured to perform operations comprising receiving from a base station a positioning reference signal (PRS) configuration for each of a set of anchor points to be used in a positioning method for the UE and an indication of a reference anchor point associated with a corresponding time stamp at which the UE is to perform received signal time difference (RSTD) measurements, wherein the reference anchor point is selected as a non-terrestrial anchor point and determining RSTD values based on the PRS configuration and the corresponding time stamp for the reference anchor point.

In a fifteenth example, the processor of the fourteenth example, wherein the time stamp comprises an absolute time, a slot index or a symbol index.

In a sixteenth example, the processor of the fourteenth example, wherein the time stamp comprises a PRS occasion.

In a seventeenth example, the processor of the fourteenth example, wherein the operations further comprise reporting, to the base station, the determined RSTD values, wherein the report further comprises an indication of the reference anchor point used in the RSTD value determinations.

In an eighteenth example, a processor of a user equipment (UE) is configured to perform operations comprising receiving from a base station a positioning reference signal (PRS) configuration for each of a set of anchor points to be used in a positioning method for the UE, wherein each of the anchor points is associated with a type of anchor point comprising a terrestrial type or a non-terrestrial type, selecting a subset of the set of anchor points based on the types of the anchor points, selecting one anchor point from the subset of anchor points as a reference anchor point based on an expected quality of a positioning reference signal (PRS) transmission received from the anchor point and determining RSTD values based on the PRS configuration.

In a nineteenth example, the processor of the eighteenth example, wherein the set of anchor points includes one or more terrestrial anchor points and one or more non-terrestrial anchor points, wherein the subset of anchor points is selected as the terrestrial anchor points only.

In a twentieth example, the processor of the eighteenth example, wherein the set of anchor points includes one or more geostationary non-terrestrial anchor points and one or more non-geostationary non-terrestrial anchor points, wherein the subset of anchor points is selected as the geostationary non-terrestrial anchor points only.

In a twenty first example, the processor of the eighteenth example, wherein the reference anchor point is selected as a serving cell for the UE.

In a twenty second example, the processor of the eighteenth example, wherein the reference anchor point is selected as a closest anchor point to the UE.

In a twenty third example, the processor of the twenty second example, wherein the closest anchor point to the UE is determined based on reference signal received power (RSRP) measurements reported by the UE or by a serving cell of the UE.

In a twenty fourth example, the processor of the eighteenth example, wherein the operations further comprise transmitting, in a report, the determined RSTD values, wherein the report further comprises an indication of the reference anchor point used in the RSTD value determinations.

In a twenty fifth example, the processor of the twenty fourth example, wherein the indicated reference anchor point is associated with a corresponding time stamp at which the UE performed the RSTD measurements.

In a twenty sixth example, the processor of the twenty fifth example, wherein the time stamp comprises an absolute time, a slot index or a symbol index.

In a twenty seventh example, the processor of the twenty fifth example, wherein the time stamp comprises a PRS occasion.

In a twenty eighth example, the processor of the eighteenth example, wherein the set of anchor points includes non-geostationary non-terrestrial anchor points only, wherein the subset of anchor points is selected as the non-geostationary non-terrestrial anchor points.

In a twenty ninth example, the processor of the eighteenth example, wherein the positioning method is observed time difference of arrival (OTDOA).

In a thirtieth example, a processor of a user equipment (UE) is configured to perform operations comprising receiving from a base station a positioning reference signal (PRS) configuration for each of a set of anchor points to be used in a positioning method for the UE, wherein each of the anchor points is associated with a type of anchor point comprising a terrestrial type or a non-terrestrial type, selecting one anchor point from the set of anchor points as a reference anchor point based on an expected quality of a positioning reference signal (PRS) transmission received from the anchor point, wherein the reference anchor point is non-terrestrial, determining RSTD values based on the PRS configuration and transmitting, in a report, the determined RSTD values, wherein the report further comprises an indication of the reference anchor point used in the RSTD value determinations associated with a corresponding time stamp at which the UE performed the RSTD measurements.

In a thirty first example, the processor of the thirtieth example, wherein the reference anchor point is selected as a serving cell for the UE.

In a thirty second example, the processor of the thirtieth example, wherein the reference anchor point is selected as a closest anchor point to the UE.

In a thirty third example, the processor of the thirty second example, wherein the closest anchor point to the UE is determined based on reference signal received power (RSRP) measurements reported by the UE or by a serving cell of the UE.

In a thirty fourth example, the processor of the thirtieth example, wherein the time stamp comprises an absolute time, a slot index or a symbol index.

In a thirty fifth example, the processor of the thirtieth example, wherein the time stamp comprises a PRS occasion.

In a thirty sixth example, the processor of the thirtieth example, wherein the positioning method is observed time differ.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. An apparatus comprising processing circuitry coupled to a memory, the processing circuitry configured to perform operations comprising:

determining a set of anchor points comprising one or more anchor points of a terrestrial type and one or more anchor points of a non-terrestrial type to be used in a positioning method for a user equipment (UE);

selecting a subset of anchor points from the set of anchor points, wherein the subset anchor points consist of a same type of anchor point;

selecting one anchor point from the subset of anchor points as a reference anchor point based on an expected quality of a positioning reference signal (PRS) transmission associated with each anchor point from the subset of anchor points;

generating, for transmission to the UE, a PRS configuration for each of the anchor points and indicating to the UE the reference anchor point; and instructing each of the anchor points to transmit respective PRSs in accordance with the PRS configuration.

2. The apparatus of claim 1, wherein the subset of anchor points is selected as the terrestrial anchor points only.

3. The apparatus of claim 1, wherein the subset of anchor points is selected as the geostationary non-terrestrial anchor points only.

4. The apparatus of claim 1, wherein the reference anchor point is selected as a serving cell for the UE.

5. The apparatus of claim 1, wherein the reference anchor point is selected as a closest anchor point to the UE.

6. The apparatus of claim 5, wherein the closest anchor point to the UE is determined based on reference signal received power (RSRP) measurements reported by the UE or by a serving cell of the UE.

7. The apparatus of claim 5, wherein the closest anchor point to the UE is determined based on a geographic information system (GIS) database and an approximate current location for the UE.

8. The apparatus of claim 1, wherein the indicated reference anchor point is associated with a corresponding time stamp at which the UE is to perform received signal time difference (RSTD) measurements.

9. The apparatus of claim 8, wherein the time stamp comprises an absolute time, a slot index or a symbol index.

10. The apparatus of claim 8, wherein the time stamp comprises a PRS occasion.

11. The apparatus of claim 1, wherein the operations further comprise:

receiving, in a report, RSTD values determined by the UE, wherein the report further comprises an indication of the reference anchor point used in the RSTD value determinations.

12. The apparatus of claim 11, wherein the operations further comprise:

determining a location for the UE based on the reported RSTD values and the indication of the reference anchor point.

13. The apparatus of claim 1, wherein the associated type of anchor point is provided to the UE for the reference anchor point.

14. The apparatus of claim 1, wherein the positioning method is observed time difference of arrival (OTDOA).

15. An apparatus comprising processing circuitry coupled to a memory, the processing circuitry configured to perform operations comprising:

determining a set of anchor points comprising one or more anchor points of a terrestrial type and one or more anchor points of a non-terrestrial type to be used in a positioning method for a user equipment (UE);

selecting a subset of anchor points from the set of anchor points, wherein the subset anchor points consist of a same type of anchor point;

selecting one anchor point from the subset of anchor points as a reference anchor point, wherein the reference anchor point is selected as a non-terrestrial anchor point;

generating, for transmission to the UE, a positioning reference signal (PRS) configuration for each of the anchor points and indicating to the UE the reference anchor point, wherein the indicated reference anchor point is associated with a corresponding time stamp at which the UE is to perform received signal time difference (RSTD) measurements; and instructing each of the anchor points to transmit respective PRSs in accordance with the PRS configuration.

16. The apparatus of claim 15, wherein the reference anchor point is selected based on an expected quality of a PRS transmission received from the anchor point.

17. The apparatus of claim 15, wherein the reference anchor point is selected as a serving cell for the UE.

18. The apparatus of claim 15, wherein the reference anchor point is selected as a closest anchor point to the UE.

* * * * *